L. TEITZEL.
CAMERA.
APPLICATION FILED NOV. 13, 1919.

1,357,363.

Patented Nov. 2, 1920.

INVENTOR.
Louis Teitzel
BY
ATTORNEY.

UNITED STATES PATENT OFFICE.

LOUIS TEITZEL, OF JUNCTION CITY, KANSAS.

CAMERA.

1,357,363.  Specification of Letters Patent.  Patented Nov. 2, 1920.

Application filed November 13, 1919. Serial No. 337,763.

*To all whom it may concern:*

Be it known that I, LOUIS TEITZEL, a citizen of the United States of America, and resident of Junction City, in the county of Geary and State of Kansas, have invented certain new and useful Improvements in Cameras, of which the following is a specification.

This invention relates to photography and particularly to a camera and the invention has for its object the provision of novel means whereby a folding or box camera may be employed in connection with film packs or with rolls, novel means being provided for converting a part of the casing and preferably the back of the camera, so that it will hold a film pack in position to be manipulated after each exposure or adjusted to exclude light from films which may be drawn from the rolls through the exposing chamber.

A still further object of this invention is to provide means for supporting the film pack and for holding the said film pack in place providing an opening through which access to the film pack may be had for manipulation, novel means being provided for closing the opening and for holding it closed when the camera is employed in connection with roll films.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
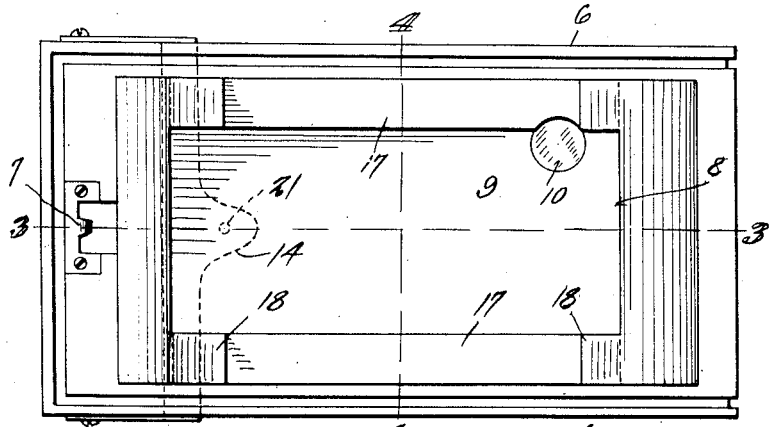
Figure 1 illustrates a view in elevation of the inner face of the camera back.
Figure 2:
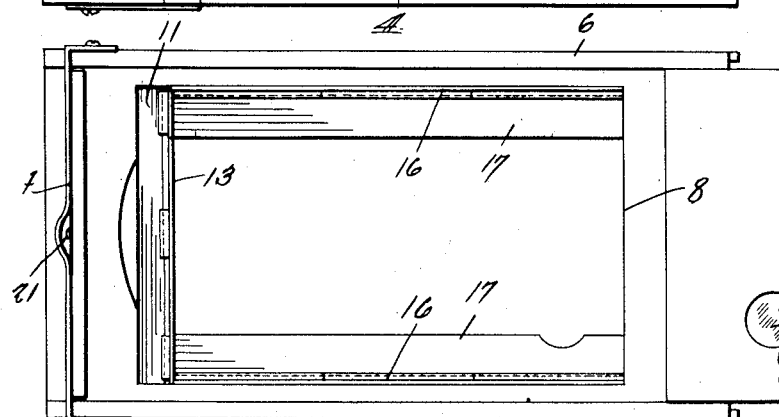
Fig. 2 illustrates a similar view of the outer side with the door open and partly broken away.

In these drawings 6 denotes the rectangular frame to be applied to the back of the camera, the same having fastenings such as 7 usual in certain types of cameras for holding the back thereon and the said frame is of such thickness or depth as to form a space or receptacle 8 in which film packs may be placed and the frame has a door 9 with a ruby glass 10 through which numbers of the films will be displayed as is usual in cameras.

The outer surface of the frame at the free end of the door has a recess 11 which forms a clearance communicating with the interior of the frame through which the film manipulating members of a film pack may be reached for changing the films after their exposures and when the film packs are used and the films are protected from light thereby, this opening is left so that the manipulation may be carried on conveniently.

When the camera is to be used in connection with rolls of film, the opening thus created has to be closed to exclude light and to provide a means for accomplishing this result, a plate 12 is secured to one edge of the frame and it has a shutter 13 hinged to it, which is adjustable to a position against the end of the door where it is held by the latch 14 which latch is employed for holding the door closed, it being shown that the latch 14 has a flange 15 which bears against the outer surface of the shutter to hold it in proper position. When the device is to be used in connection with film packs, however, this door is open and lies on the bottom of the recess 11 so that the film pack may be operated.

Figure 5:
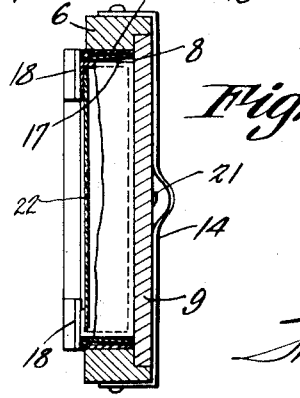
Fig. 5 illustrates a sectional view thereof when employed with film packs.

The longitudinal edges of the frame on the inside also have plates 16 secured to them and these plates have light excluding plates or shutters 17 hingedly connected to them which lie at right angles to the interior surfaces of the frame when the device is to be used in connection with roll films, and when film packs are used, the plates or shutters 17 lie parallel with the plates 16 as shown in Fig. 5, when they accommodate the film pack 22.

Figure 3:
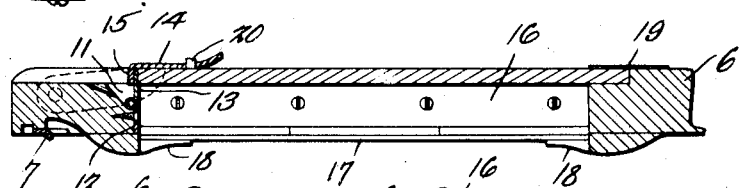
Fig. 3 illustrates a longitudinal sectional view of the device with the door closed.
Figure 4:
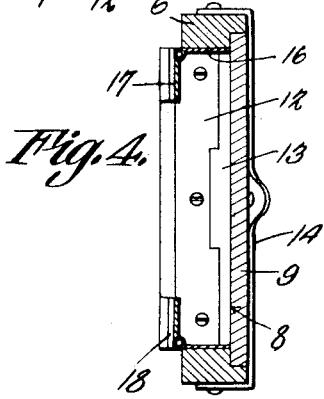
Fig. 4 illustrates a transverse sectional view showing the position of parts when employed in connection with a roll film.

At the corners of the frame interiorly, there are four shoulders or flanges 18 which support the film pack and also support the members 17, as shown in Fig. 3, so that light is excluded from the film by these shutters or members 17.

As shown in the drawing, the door 8 has a hinge 19 so that it may be swung to an open or closed position and it has a stud 20 which enters an aperture 21 of the latch 14 when the door is to be held closed and the relation of parts is such that the latch has the dual function of holding the door closed and the shutter 13 also closed in the position shown in Fig. 3.

I claim—

1. In a convertible film pack and roll film camera, a frame having a space for the reception of film packs, the said frame having a recess in its outer surface at the end thereof through which the film pack is accessible, a door for closing the back terminating at the said recess, a shutter hingedly connected to the frame and adapted to lie against the wall of the recess or against the end of the door, means for holding the shutter in engagement with the door, and means for excluding light from the interior of the camera when the film pack is removed.

2. In a convertible film pack and roll film camera, a frame having a door and a space thereunder for the reception of a film pack, plates secured to the interior of the frame at the sides thereof, members hinged to the said plates and adapted to lie parallel with the plates or at right angles thereto, means for supporting a film pack within the frame, said frame having a recess at one end on its outer surface, a door hinged to the frame and terminating at the said recess, a shutter hinged to engage the end of the door or to lie in the recess, a latch pivotally connected to the frame and having a flange for holding the shutter in engagement with the end of the door, and means whereby the latch holds the door closed.

LOUIS TEITZEL.